US005321625A

United States Patent [19]

Humm et al.

[11] Patent Number: 5,321,625

[45] Date of Patent: Jun. 14, 1994

[54] APPARATUS FOR STORING AND DELIVERING SALE UNITS

[75] Inventors: Siegfried Humm, Schoental-Westernhausen; Gabor Palosi, Oehringen-Büttelbronn; Karl Weidner, Ingelfingen, all of Fed. Rep. of Germany

[73] Assignee: Adolf Wurth GmbH & Co. KG, Fed. Rep. of Germany

[21] Appl. No.: 802,890

[22] Filed: Dec. 6, 1991

[30] Foreign Application Priority Data

Dec. 7, 1990 [DE] Fed. Rep. of Germany .... 4039166

[51] Int. Cl.$^5$ .............................................. G06F 15/20

[52] U.S. Cl. ........................................ 364/479; 221/7; 221/12; 221/83; 340/825.35

[58] Field of Search .................... 364/478, 479; 221/2, 221/5, 7, 8, 9, 12, 13, 14, 83, 90, 154, 155, 76, 77, 129; 235/381; 340/825.35; 194/217

[56] References Cited

U.S. PATENT DOCUMENTS

| | | | |
|---|---|---|---|
| 3,556,284 | 1/1971 | Dyer et al. | 198/138 |
| 3,933,231 | 1/1976 | Vinet | 194/1 R |
| 4,412,292 | 10/1983 | Sedam et al. | 364/479 |
| 4,553,211 | 11/1985 | Kawasaki et al. | 364/479 |
| 4,631,357 | 12/1986 | Grunig | 340/825.35 |
| 4,695,954 | 9/1987 | Rose et al. | 364/479 X |
| 4,722,058 | 1/1988 | Nakayama et al. | 364/479 |
| 4,801,236 | 1/1989 | Katzenschwanz | 198/483.1 X |
| 4,961,507 | 10/1990 | Higgins | 221/129 |
| 5,025,950 | 6/1991 | Trouteaud et al. | 364/479 X |
| 5,091,713 | 2/1992 | Horne et al. | 364/479 X |
| 5,169,027 | 12/1992 | Falk et al. | 221/76 X |

FOREIGN PATENT DOCUMENTS

| | | |
|---|---|---|
| 0203687 | 7/1989 | European Pat. Off. . |
| 1474779 | 3/1969 | Fed. Rep. of Germany . |
| 1474786 | 3/1969 | Fed. Rep. of Germany . |
| 1574236 | 6/1971 | Fed. Rep. of Germany . |
| 2447618 | 4/1976 | Fed. Rep. of Germany . |
| 2736197 | 2/1979 | Fed. Rep. of Germany . |
| 2751066 | 10/1979 | Fed. Rep. of Germany . |
| 3048394 | 7/1982 | Fed. Rep. of Germany . |
| 3213119 | 10/1983 | Fed. Rep. of Germany . |
| 3308072 | 3/1984 | Fed. Rep. of Germany . |
| 8508949 | 3/1985 | Fed. Rep. of Germany . |
| 3546598 | 10/1986 | Fed. Rep. of Germany . |
| 3610347 | 10/1987 | Fed. Rep. of Germany . |
| 1156665 | 5/1958 | France . |
| 2551898 | 3/1985 | France . |
| 2562293 | 4/1985 | France . |
| 8804085 | 6/1988 | PCT Int'l Appl. . |
| 612024 | 6/1979 | Switzerland . |
| 1565552 | 4/1980 | United Kingdom . |
| 2045989 | 11/1980 | United Kingdom . |
| 2071384 | 9/1981 | United Kingdom . |

*Primary Examiner*—Joseph Ruggiero
*Attorney, Agent, or Firm*—Quarles & Brady

[57] ABSTRACT

The apparatus is provided for delivering assembly and machining expendable materials or tools. It comprises an internal continuous lift mechanism with different compartment rows arranged in rotary manner to move past a removal door row. An inputting keyboard for the positioning of the particular compartment row in front of the removal door row also controls the unlocking of door in the door row associated with the selected compartment.

The delivery unit is connected by means of a long-range transmission means to a data processing unit, which records the removal of materials and optionally initiates reloading, billing, etc.

14 Claims, 4 Drawing Sheets

APPARATUS FOR STORING AND DELIVERING SALE UNITS

BACKGROUND OF THE INVENTION

Assembly and machining expendable materials or tools, e.g. screws, rivets or sawblades are kept in stock in cabinets or separate stores as a function of the size of the organization processing them. However, quite apart from tying up capital, this also involves stockkeeping and at least certain administrative measures for checking the existing stock and for reordering. Frequently, excessive stocks of certain types are kept, which are finally not used or not used in an optimum manner.

Product selling machines are also known, but are only suitable for delivering a very limited number of different products. In one known automatic selling machine of this type (DE-OS 15 74 236) there are e.g. eight storage planes, each plane containing identical products.

In another known apparatus of this type (US-A-4 811 764) several rotatable magazines are superimposed, each magazine also containing only a single product.

In addition, mechanical cabinets with a continuous circulatory lift construction are known (DE-C2-30 48 394), in which with the aid of an indicator system, it is indicated in which compartment a desired product is located. This compartment can be moved to a specific removal point. However, in this case, access is always possible simultaneously to a large number of compartments, so that such an apparatus would not be suitable as a product selling machine.

In addition, a product selling or vending machine is known, which is connected by means of a telephone line to a central monitoring location (CH-AS-61 20 24). The latter is able to establish whether the selling machine has a fault or is empty. The goods are constituted by tickets, so that the machine need only have two product types, namely tickets and coins. Before the tickets are removed, they are paid for by feeding in coins.

Also, in the case of bank cash dispensers, the product availability, namely banknotes, is very limited. Admittedly, a debit calculation takes place by means of a control room, but it is only necessary to deduct the value and there is no need to additionally calculate a specific article.

SUMMARY OF THE INVENTION

An object of the invention is therefore to provide an apparatus for storing and delivering sale units not suffering from the disadvantages of the prior art and in particular leading to simplifications with respect to stockkeeping and accessibility for such materials.

This object is achieved by an apparatus for storing and delivering sale units, particularly assembly and machining expendable materials or tools, which have at least one delivery unit connectable to long-range transmission means.

The delivery unit can contain the sale units, e.g. screw boxes, and by means, of the long-range transmission means it is possible to monitor the removal and stock from a remote control room or exchange. This leads to a significant simplification relative to stock control and the reloading of the delivery unit. The existing stock can be adapted in an optimum manner to the needs for a particular delivery unit by the control room, and consequently, waiting and procurement times are avoided. There is the additional advantage that the sale units contained in the delivery unit can still be owned by the supplier and the consuming company is only automatically debited by the control room following the actual removal from the delivery unit. The supplying company can also control the entire stockkeeping operations through its control room and can carry out reloading in accordance with needs and without having to intervene. This also facilitates the decentralized stockkeeping in larger companies, and transportation procedures are avoided. The advantage for the supplier is that sales personnel are relieved of the task of placing routine orders and are more readily available to customers for giving advice in special cases.

In a preferred embodiment, the delivery unit can have a plurality of compartments for optionally different sale units; positioning means in order to move at least one compartment into a delivery position; release means for releasing at least one positioned compartment for removal purposes; as well as signal generating means, which generate signals as a function of the delivery position and the removal, and long-range transmission means transmitting the signals to a data processing unit remote from the delivery unit in which are recorded the removal and the associated delivery position.

The delivery unit can be constructed in different ways. Preference is given to a continuous circulatory lift-like arrangement of juxtaposed compartment rows, which can be moved forwards and backwards in motor manner, so that it can be very rapidly moved into the correct position following a preselection, e.g. based on a color code and precise positioning via a number system. One of several juxtaposed doors can be unlocked, so that the selected compartment can be opened. However, it can also be controlled in such a way that a release only takes place when the delivery unit receives a release instruction from the control room and e.g. the compartment actually contains a sale unit. The removal, e.g. the door opening and/or closing, generates a signal which, together with the basic data of the delivery unit and the position coding of the corresponding compartment, is recorded in the control room, where it updates stock and billing data banks.

Reloading of the delivery unit can take place at regular intervals or also as a function of consumption. The delivery unit loader can bring the unit into a loading position, so that stock replenishment can be recorded in a similar way by long-range transmission.

The compartments of the delivery unit can e.g. have a greater depth than the normal sale unit, so that conventionally two sale units can be housed therein, which can be removed together. This permits the housing in the compartment of larger sale units, e.g. a pack of sawblades.

The long-range transmission can take place by means of a public data transmission network, e.g. the telephone network. One possibility is so-called TEMEX transmission, which, following corresponding coding of the signals in a remote control unit, transmits them via the telephone network to a tele-TEMEX exchange, which, optionally via a main exchange, transmits them onto the routing desk associated with the data processing unit, where they are recorded. The retransmission of enable or inhibit signals, e.g. in the case where payments have not been made, etc., takes place in the same way.

This apparatus makes it possible to simplify and improve numerous operations. Through the arrangement of a large number of compartments, it is possible by loading several compartments with the same sale units, to solve the problem of different consumption quantities. The positioning device for the compartments and/or the release initiated after positioning has taken place can be made dependent on an access authorization by means of a code number, key, etc. This could even differ for different compartments of the same delivery unit, so that e.g. certain materials would only be accessible to specific persons. This can control the problem of the wastage or theft of materials.

When several delivery units are connected to the same long-range transmission link, an association is possible by different coding of the means. The control room or exchange can provide the company with the special service of a precise listing of the expendable materials, so that the calculation thereof is facilitated.

By cooperation between the supplier and the company, it is also possible to adapt to changed conditions, in that e.g. the company, by inputting the standard parts contained in parts lists and the quantities to be manufactured, permits an optimum loading and an immediate adaptation following a modification to planning data. It would also be possible for the company to automate delivery, in that on inputting a specific product characterization on the basis of stored parts list data, only the correct compartments are opened.

BRIEF DESCRIPTION OF THE DRAWINGS

These and further features of the invention can be gathered from the claims, whose wording by reference is made into the content of the description, as well as from the description and drawings, the individual features being realizable either alone or in the form of subcombinations in an embodiment of the invention and in other fields and can represent advantageous, independently protectable constructions for which protection is hereby claimed. Preferred embodiments of the invention are described hereinafter relative to the drawings, wherein show:

DETAILED DESCRIPTION OF THE PREFERRED EMBODIMENTS

Figure 1:
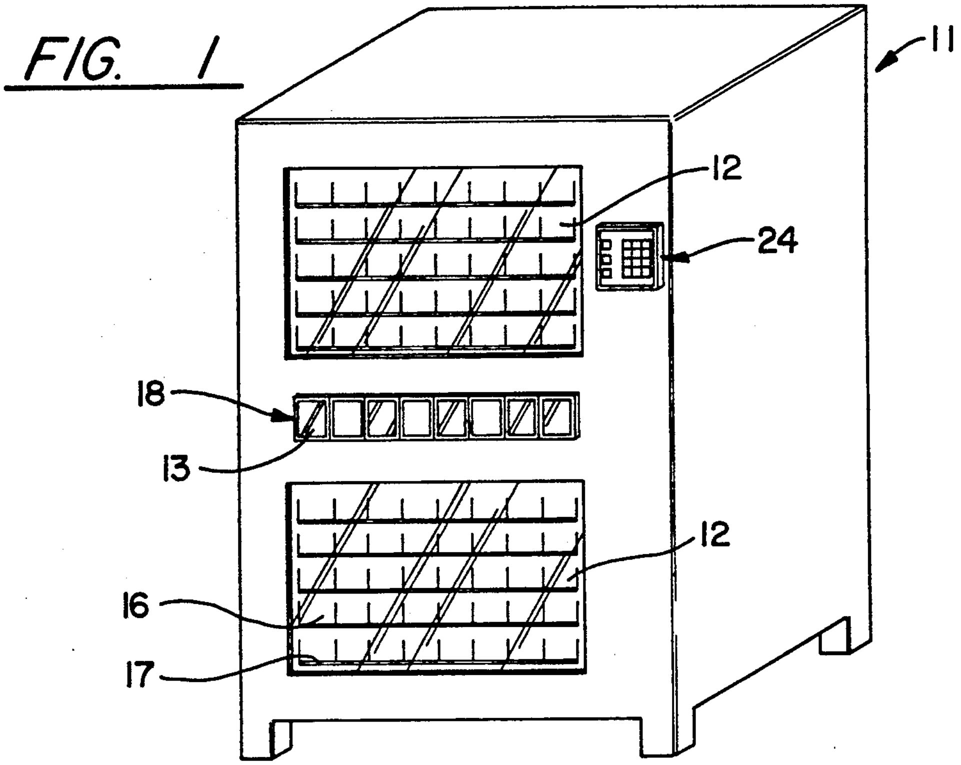
FIG. 1 a diagrammatic perspective view of a delivery unit.
Figure 4:
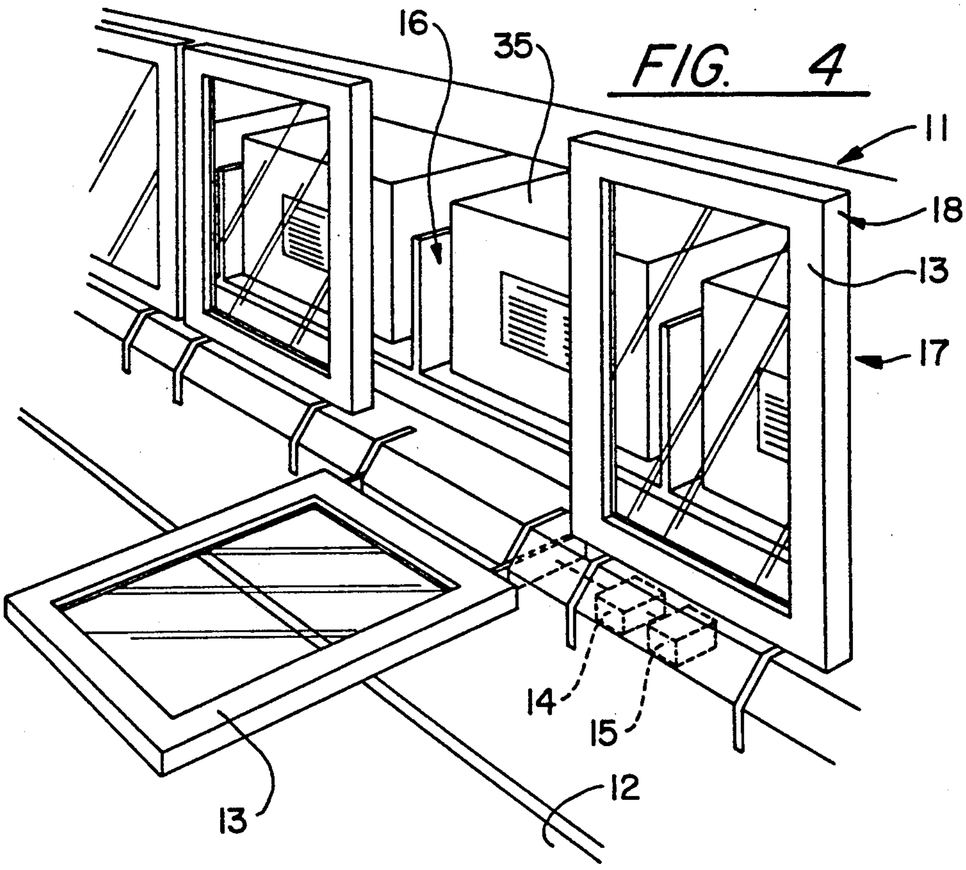
FIG. 4 a detail of a delivery unit.
Figure 5:
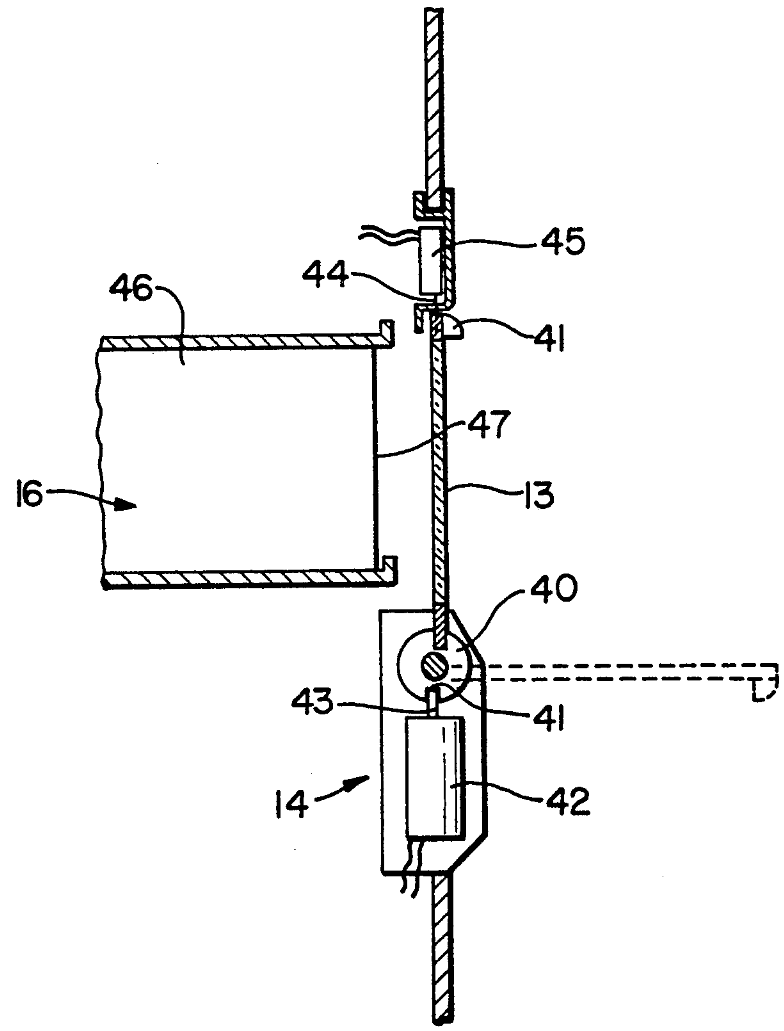
FIG. 5 the arrangement of a door.

FIG. 1 shows a delivery unit 11 in the form of a cabinet, which is provided on its front with upper and lower viewing and loading doors 12 and, in a central easy removal height, is provided with a plurality of juxtaposed, individually openable removal doors 13 in a row 18. These removal doors 13 which are also visible in FIGS. 4 and 5 are constituted by flaps, which have in a frame a viewing window insert and are pivotable about a horizontal, bottom spindle. They have an electrically operated lock 14 (FIG. 4) located in a concealed axial area of the spindle and which can be mechanically connected to a door signal generator 15 for opening or closing the removal door, e.g. in the form of a magnetic bolt.

Figure 2:
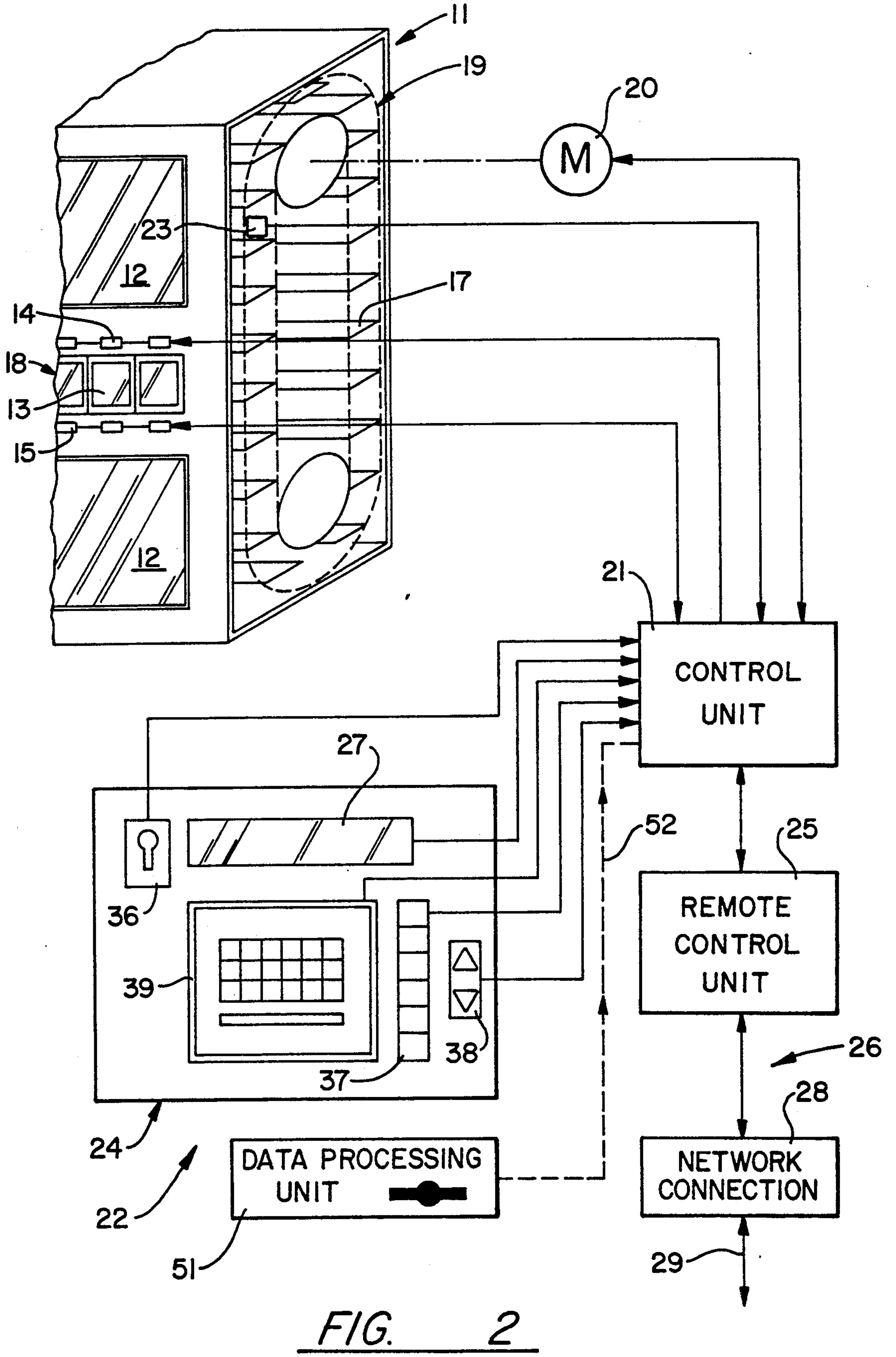
FIG. 2 a block circuit diagram of a delivery unit and its connection.

Within the delivery unit 11 are provided a plurality of compartments 16 in rows 17 of e.g. eight juxtaposed compartments. The compartment rows 17 combined to form a unit are fitted to a continuously rotating lift mechanism 19, so that a large number of these rows 17 can be moved passed the door row 18. It is e.g. possible for 24 compartment rows 17 to be located in the delivery unit, which can be brought into the delivery position 18 by a lift mechanism 19 (indicated in FIG. 2) by means of a reversible motor 20. The mechanism and motor, together with a control unit 21 for the lift 9, form positioning means 22. The control unit 21 operates electronically, e.g. with a microcomputer and corresponding electronic or electromechanical output switching elements for controlling the motor, the locking means and the like.

It receives signals from the door signal generators 15, optionally from a row signal generator 23 for the position of the individual compartment rows 17, from a keyboard 24 and from a remote control unit 25, which belongs to the long-range transmission means 26, as well as possibly feedbacks from the motor 20. It supplies signals to a display panel (display) 27 belonging to the keyboard, to the motor, to the locking means 14 and to the remote control unit 25.

Figure 3:
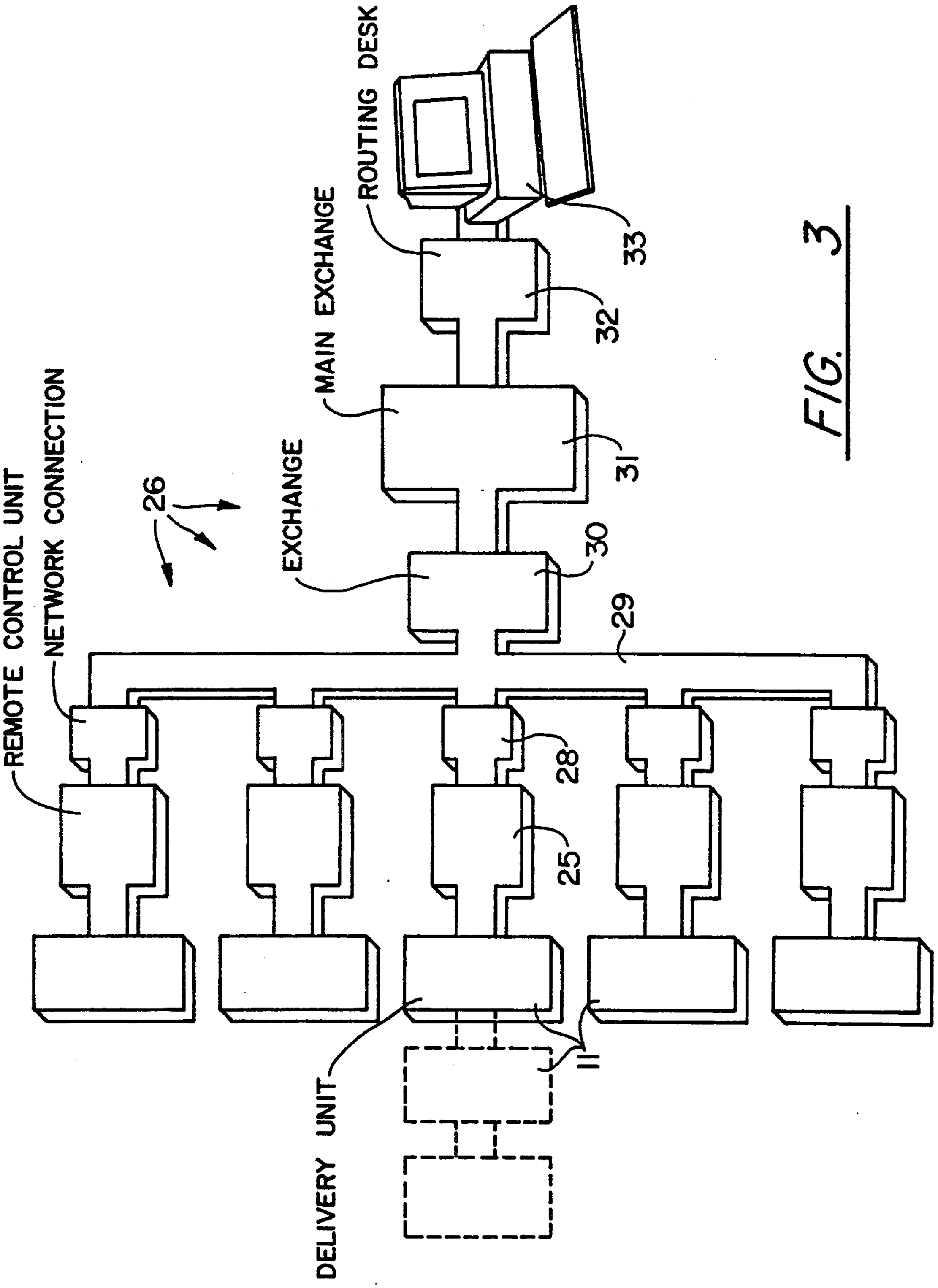
FIG. 3 a block circuit diagram of several delivery units connected by means of a data network to a data processing central unit.

The long-range transmission means 26, is diagrammatically shown in FIG. 3. Several delivery units 11 are in each case connected by means of a remote control unit 25 to a TEMEX network connection 28, from where they are passed via the normal telephone network 29, a TEMEX exchange 30 and optionally a main TEMEX exchange 31 to the TEMEX routing desk 32 of a supplier through which they are fed into the supplier's data processing unit 33. The signals follow the same route on the return path.

The postal TEMEX system transmits data in a correspondingly coded form via the telephone network. In the same way, the information can also be transmitted by fax or by dialing modems. In addition, several delivery units 11 can be connected to one remote control unit.

The apparatus functions as follows. On the first occasion, each delivery unit is loaded with numerous different or also identical sale units, via the upper and lower viewing and loading doors 12, which can be opened e.g. with a key by the supplier's customer service employee. In each of the e.g. 192 compartments, which have a considerable depth compared with the width and height, are normally placed two sale packs e.g. for screws, or a single sale pack for longer articles. Loading takes place according to a specific plan discussed with the customer holding the delivery unit and which is either already contained in the supplier's data processing unit 33, or is inputted by the loading person via a keyboard and is supplied to the same by the long-range transmission means 26. Thus, with each compartment is associated a specific article. Each compartment can contain several packs of the same type or associated articles, e.g. screws and the associated nuts.

If the consumer has a requirement for one of the articles, optionally after the operation of a key-operated switch 36, or the inputting of a code number only known to specific persons, he can operate the delivery unit. He can set the lift mechanism 19 into operation by means of a rough preselection 37 in the form of keys for different zones, which are e.g. marked in color, or by an "upwards-downwards⇄ keyboard 38, so as to bring the corresponding group of articles from which he can make a fine selection into the viewing field (doors 12). He can then make the precise selection by means of the packing inscriptions and by means of a figure keyboard 39 can select the precise number of the compartment. Controlled by the control unit 21, the lift mechanism 19 then moves the compartment row 17 with the desired compartment behind the door row 18 and unlocks, by releasing the locking means 14, those doors behind which is located the compartment with the desired article, while the remaining doors remain locked.

The positioning can also take place without a rough preselection, if the consumer already knows the corresponding compartment number, or is provided with it beforehand in some other way, e.g. on a drawing or operating instructions. The motor 20 moves the desired compartment row in the fastest possible way into the desired delivery position either forwards or backwards. It is also possible to provide a connection 50 for an automatic input of position details, e.g. from a data processing unit 51 containing parts list data. For example, the user can directly input the article number.

The control contained in the unit, which not only contains an association between the compartment numbers and the articles, but also knows whether a specific article is still in the compartment ensures that if a compartment is empty, without positioning the compartment the user directly knows that the article is no longer present, which obviously saves time.

The positioning system is stopped at the time of unlocking. The consumer can then open the corresponding compartment and remove the articles contained therein. On closing (or even on opening), the associated signal generator 15 emits a removal signal which, on closing the door, also makes the positioning device operational again. After corresponding conversion and coding in the control unit and in the remote control unit, the removal signal can be passed via the telephone network 29 to the exchange, which only constitutes a switching station and separates the signal from the telephone signals. In the main exchange 31 with the signal is associated a subscriber identification and optionally other data (position, time, etc.), before the correspondingly prepared signal is fed via the routing desk 32 to the supplier's data processing central unit 33. In the latter the signals are processed and in particular the inventory of the particular delivery unit is updated, optionally a reloading indication is given and invoicing takes place. The central unit can also block a specific delivery unit.

It is possible to store the data in the unit and only supply them to the exchange at regular intervals, e.g. twice a week and this naturally takes place in program-controlled manner.

The apparatus can also be designed in such a way that the data processing unit 33 only brings about the release of those compartments which, according to the inventory, still contain articles, although this is usually apparent to the consumer. It is generally possible to provide any random long-range transmission.

It is possible for the consumer to change or delete the selection, provided that the removal has not yet been acknowledged by opening the door. For the case of a power failure or a disconnection of the unit for other reasons, the control unit stores the present position or is set up in such a way that on switching on again it automatically moves into a starting position using the shortest route. In the case of filling or maintaining the unit, there is a corresponding notification to the data processing central unit 33 and removal is blocked during the loading process.

Reloading takes place in the following way. At regular intervals the exchange establishes which articles are missing in a specific unit and draws up a resupply order for the missing articles. The supply note contains a list of the subsequently supplied articles, the compartment number being additionally given for each article. The operator identifies himself to the automatic machine by a check card or a secret number and starts to fill the machine. The operator inputs into the operating panel the compartment number located on the supply note, so that the machine being filled positions this compartment number in the removal row and unlocks door 14 associated with the corresponding compartment. The filling person opens this door and slides the article on the supply note through the open door into the compartment and then the door is closed again. On closing the door the automatic machine receives in its control the indication that the particular article is again in the compartment. This is repeated until the operator has worked through the supply note.

According to a further development of the invention, the association between the compartments and the articles stored in a memory can be modified in situ and suitable devices can be provided for this.

The display 24 can also be extended in such a way that it corresponds to a complete display of a standard computer screen, optionally with a complete keyboard. The operator can not only dial the compartment number, but can also directly input the article number. The apparatus can assist him in this, in that it establishes inputting errors.

According to the invention, by inputting the article number of an article not present in the apparatus, it can be ordered from the exchange. For this purpose the apparatus, e.g. on a replaceable floppy disk, contains a list of all articles obtainable from the supplier. This order can be given together with the regularly occurring data communications, so that the ordering company can save the need for a telephone call or a written order. The apparatus can also contain a printer connection or a simple printer, so that on each occasion or on request it can print out a list of orders or also a list of removals. This can be appropriate for associating the removals with the individual cost positions.

This apparatus need not be set up directly on the consumer's premises, but can e.g. be located in a place accessible to the public, where several users can make use of the apparatus. These users must then identify themselves to the apparatus, e.g. using a check card or the like. In this case the debit calculations apply to the customer who has identified himself by the check card or the like.

FIG. 5 shows in simplified form how a door 13 can be secured against undesired opening. The door 13 is fixed to a shaft 40 mounted in rotary manner. For opening purposes it is necessary to grip a tongue 41. In the closed state of the door 13 it is doubly locked, once in the vicinity of the bottom and once in the vicinity of the top. The shaft 40 contains a bore 41, in which engages a pin 43 operated by an electromagnet 42. The pin 43 is e.g. subject to the action of a spring in such a way that it is pressed into the bore 41 when the electromagnet is currentless. In the same way on the top of the door 13 is provided an only diagrammatically indicated pin 44, which also passes into an opening. The pin 44 can be raised by an electromagnet 45. In both cases the pin 43 or 44 is only displaced if the electromagnet 42 or 45 previously disengages a catch or the like.

Electric locking in such a way that only one door 13 can be opened only when the lift system is stationary is carried out by the electronic control of the apparatus.

The individual compartments 16 of each compartment row are separated from one another by partitions 46, which extend up to the front of the cabinet to such an extent that the space between the leading edges 47 of the partitions 46 and the flap of the adjacent door is not sufficient to remove articles from the adjacent compartment 16. Thus, the opened door 13 only gives access to the compartment 16 positioned directly behind it.

If the power supply fails with the door open, the apparatus control ensures that the information at the time of the power failure remains stored, so that working can again take place at the same point when the power supply is reconnected. If the door is closed again during the power failure, it is also ensured that debiting can still take place after reconnection of the power supply.

As a result of the use of a lift mechanism a very large number of different products can be housed in a confined space. Through the arrangement of a row of juxtaposed doors 13 corresponding to a lift compartment row, there can be access to the entire lift content. Through the possibility of only being able to open a single door, access is in fact only permitted to a single paternoster compartment. Thus, the available space is utilized in an optimum manner and despite the large number of articles only little space is required. This is important for the particular application described here, namely that the automatic machine is held by the consumer, although he does not own the goods and the machine.

What is claimed is:

1. Apparatus for storing and delivering articles, comprising:

long range transmission means;

continuous lift assembly;

at least one delivery unit operatively connected to said long-range transmission means, in which the delivery unit has a plurality of compartments juxtaposed in a plurality of compartment rows which are arranged on the continuous lift assembly;

positioning means for moving each one of the compartment rows in turn into a delivery position in which a compartment row is in alignment with a row of separately openable doors arranged on a front side of the delivery unit;

release means for the release of at least one of the doors to expose a corresponding compartment behind the door and;

signal generating means for generating signals as a function of alignment of a compartment row with the delivery position and the release of a door, the long-range transmission means being capable of transmitting the signals to a data processing central unit remote from the delivery unit for recording door releases and delivery position alignments.

2. Apparatus according to claim 1, wherein said compartments (16) are motor-movable by the shortest route to said delivery position and in two directions for controlling their alignment with the delivery position.

3. Apparatus according to claim 1, wherein the positioning means (22) of the delivery unit (11) has selection means (24) for positioning at least one selected compartment (16) in the delivery position and preselection means (37 38) for positioning a plurality of compartments (16) in a viewing area of the delivery unit.

4. Apparatus according to claim 1, wherein the positioning means (22) has a selection keyboard (39) and a display (27) for displaying coding of the compartments (16).

5. Apparatus according to claim 1, wherein the release means only unlock that door (13) behind which is located the compartment holding a selected.

6. Apparatus according to claim 1, wherein each of said signals indicate an end of a removal process and initiates the delivery unit (11) for a new removal cycle.

7. Apparatus according to claim 1, wherein the long-range transmission means (26) has a remote control unit (25) by means of which the delivery unit (11) is connected to a public data transmission network (29), the public data transmission network containing central exchanges (30, 31), which add data to the signals.

8. Apparatus according to claim 7, further comprising a data processing central unit connected remotely from the delivery unit through the long-range transmission means, the data processing central unit being capable of generating inhibit and enable signals and passes said inhibit and enable signals via the long-range transmission means (26) to the delivery unit (11) for inhibiting access to at least one of: individual compartments (16) and the complete delivery unit (11).

9. Apparatus according to claim 7, further comprising means for passing filling signals via the long-range transmission means (26) to the data processing central unit (33) after the delivery unit is stocked with articles.

10. Apparatus according to claim 7, further comprising memory means, the association between the compartments (16) and the content of the compartments (16) being stored in said memory means.

11. Apparatus according to claim 10, wherein the memory can be interrogated from the exchanges via the public data transmission network.

12. Apparatus according to claim 10, wherein at least one of the positioning device and the memory means is controllable by inputting article numbers coordinated with articles in the compartments.

13. Apparatus according to claim 7, further comprising means for transmitting orders for articles not contained in the apparatus through the long-range transmission means.

14. Apparatus according to claim 10, wherein said memory can be overwritten with additional order information.

* * * * *